J. L. MUSSER.
DEVICE FOR CLEANING BRUSH AND ROOTS FROM WOODLAND.
APPLICATION FILED MAR. 3, 1911.

1,002,740.

Patented Sept. 5, 1911.

UNITED STATES PATENT OFFICE.

JOHN L. MUSSER, OF LANCASTER, PENNSYLVANIA.

DEVICE FOR CLEANING BRUSH AND ROOTS FROM WOODLAND.

1,002,740.   Specification of Letters Patent.   Patented Sept. 5, 1911.

Application filed March 3, 1911. Serial No. 612,120.

*To all whom it may concern:*

Be it known that I, JOHN L. MUSSER, a citizen of the United States, residing at Lancaster, in the county of Lancaster and State of Pennsylvania, have invented certain new and useful Improvements in Devices for Cleaning Brush and Roots from Woodland, of which the following is a specification.

This invention relates to a device for cleaning brush and roots from woodland.

In clearing land of heavy timber, the trees are usually cut within a short distance from the ground and the stumps of the trees ultimately removed by blasting or manual operations, such as grubbing. When the stumps are blasted out of the ground, it frequently occurs that roots of the trees are left in the ground, and almost invariably there is an underbrush of heavy bushes and small trees, which must be removed. These are usually grubbed or pulled up at considerable expenditure of labor and money.

The principal object of this invention is to provide a device which may be drawn by horses or other power over the land to completely remove the underbrush, roots and small trees, or so loosen them, or some of them, depending upon the size and character of the growth, that they can be readily removed by hand. In most instances, this growth, upon which the device is intended to operate, will be completely removed from the ground, and need only be gathered up and carried away. The form of the frame is such that all of the surface, between the maximum width of the frame, is operated upon, and the teeth are so arranged in the frame that the tearing or pulling action thereof, upon the growth, will produce the best possible results and the running position of the device is such that the dislodged brush, etc., will pass under or be thrown to the sides, under and outside the device, thus preventing clogging.

Figure 1:
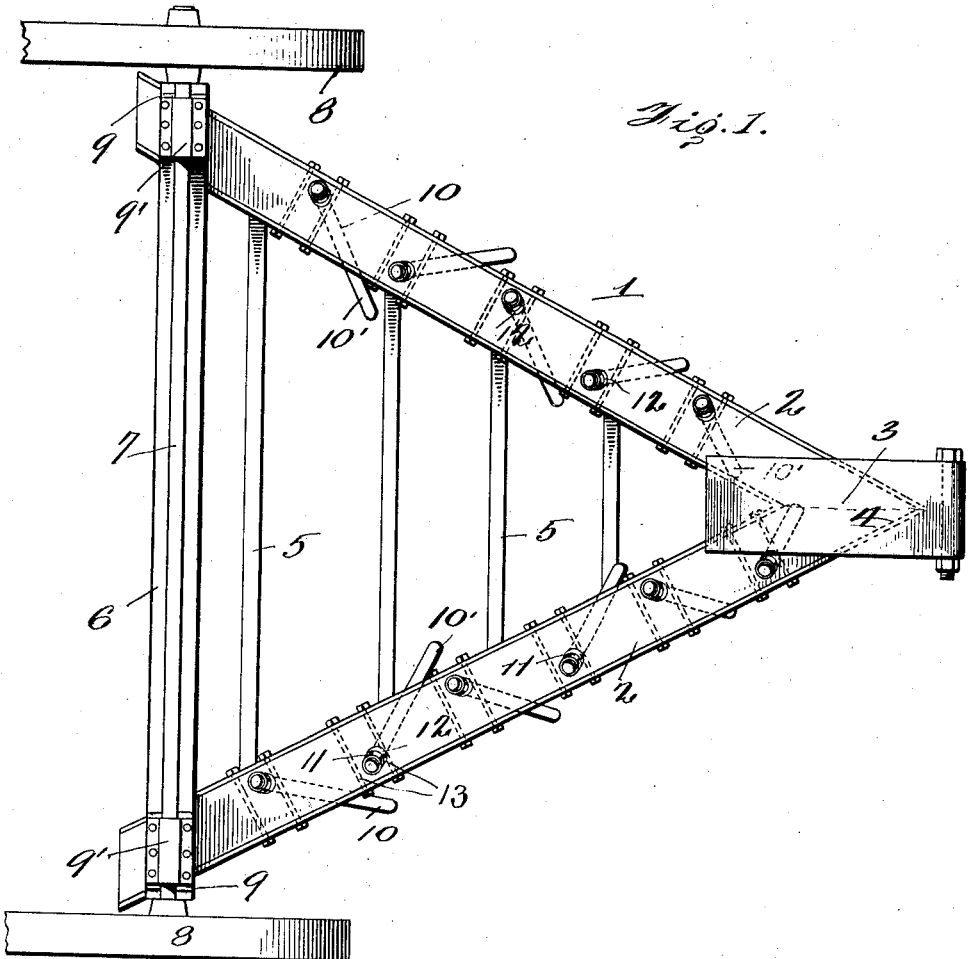
Figure 2:
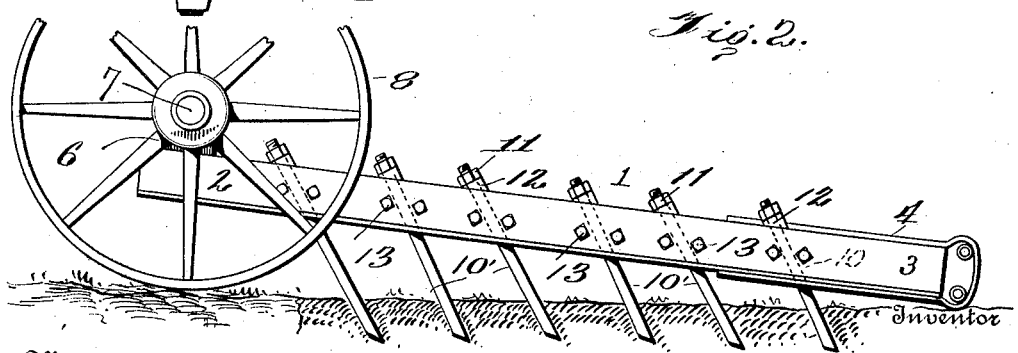

Referring to the drawings, Figure 1 is a plan view of the device; Fig. 2 is a side elevation thereof.

Referring to the drawings, the numeral 1 designates the frame, which is V-shaped and composed in the main of two beams 2, preferably of wood, joined at their forward ends 3. To the front end of the frame is attached a clevis 4, for the attachment of any suitable draft contrivance and this clevis is so formed on its under side that it serves as a shoe upon which the forward end of the device runs. The side bars of the frame are held rigidly together by a series of cross-ties 5, and the rear ends of the side bars are connected firmly together, by a cross-beam 6, which carries an axle 7 upon which are mounted wheels 8 which support the rear end of the frame, a suitable distance from the ground. This axle is supported in bearing plates 9 and clips 9', bolted through the cross-beam and side bars of the frame, thus rendering the axle and wheels carried thereby detachable, so that the device may, if found desirable, be dropped down at the rear end, to cause the rear teeth to be extended for a greater depth into the ground.

The side bars of the frame are bored, as indicated at 10, for the reception of a series of teeth 10' which increase in length from the front to the rear of the frame. The upper ends of these teeth are externally threaded for the reception of nuts 11, which are tightened against beveled washers 12, on the under and upper faces of the side beams. The teeth are arranged in staggered relation, and inclined both forwardly and laterally with relation to the side bars, so that the ends of the alternate teeth, will extend alternately inside and outside the side bars, as shown. For instance, in placing the opposite teeth nearest the rear end of the device, it will be noted that the bore for the tooth on one side begins close to the outer edge of the bar, while the bore for the opposite tooth begins adjacent to the inside of the opposite bar. These bores, for instance, starting from the top of the side bars, will extend obliquely through said bars and come out on the under side at the same distance from the lower face of the bar as the upper end of the bore is from the upper face.

All of the bores extend forward and obliquely to lines drawn through their centers, transverse to the side bars, thus supporting the teeth at angles both forward and lateral, as shown. This arrangement of teeth causes them to cover a greater area of surface and also increases their pulling force upon the growth which it is desired to remove.

Preferably, I strengthen the side bars by metallic inner and outer plates, connected through the side bars by bolts 13, and preferably the under sides of the side bars carry plates 13', only one being shown attached thereto by any suitable means, such as screws.

When it is desired to drop the rear end of the device, to cause the rear teeth to extend farther into the ground, it is merely necessary to remove the bolts from the clips and plates 9 and 9', when the axle and wheels may be removed.

It will be noted that the arrangement of the teeth is such that when the wheels are removed, and the whole device lowered, the forward inclination of the teeth will be materially changed and extended into the ground at a different angle and to a greater depth, which may be desired under different soil conditions.

The bolts 13 are passed through the side bars adjacent to the points of passage of the teeth through the bars, by which obviously, the side bars at these points are strengthened where greater strength is desirable.

Having thus described my invention, what I claim is:

1. A device of the character described, comprising two converging beams connected together, each being provided with two series of teeth, one series projecting from one side of the beam in a forwardly and inwardly-inclined direction and the other series projecting from the opposite side of said beam in a forwardly and outwardy-inclined direction, whereby said teeth will cover a greater surface area and increased pulling capacity.

2. A device of the character described, comprising two converging beams braced together, each beam being provided with two series of teeth, one series projecting from one side of the beam in a forwardly and inwardly inclined direction and the other series projecting from the opposite side of said beam in a forwardly and outwardly-inclined direction, the teeth of both series gradually diminishing in length toward the forward end of the device, whereby different degrees of penetration will be provided.

3. A device of the character described, comprising two converging beams connected together by braces, each beam being provided with two series of teeth, one series projecting from one side of the beam in a forwardly and inwardly-inclined direction and the other series projecting from the other side of said beam in a forwardly and outwardly-inclined direction, the length of both series of teeth gradually diminishing toward the forward end of the device and wheels supporting the rear end of the device, whereby the teeth are caused to penetrate the soil at equal or uniform depth.

In testimony whereof I affix my signature in presence of two witnesses.

JOHN L. MUSSER.

Witnesses:
FRANCIS S. MAGUIRE,
FRANK G. BRERETON.

---

Copies of this patent may be obtained for five cents each, by addressing the "Commissioner of Patents, Washington, D. C."